March 29, 1955

R. J. WALTER 2,705,152

VEHICLE TANDEM AXLE SPRING SUSPENSION

Filed July 8, 1953

INVENTOR.
Robert J. Walter
BY
Popp and Sommer
Attorneys.

March 29, 1955  R. J. WALTER  2,705,152
VEHICLE TANDEM AXLE SPRING SUSPENSION
Filed July 8, 1953  10 Sheets-Sheet 3

INVENTOR.
Robert J. Walter
BY
Popp and Sommer
Attorneys.

March 29, 1955 R. J. WALTER 2,705,152
VEHICLE TANDEM AXLE SPRING SUSPENSION
Filed July 8, 1953 10 Sheets-Sheet 5

INVENTOR.
Robert J. Walter
BY
Popp and Sommer
Attorneys.

March 29, 1955

R. J. WALTER 2,705,152

VEHICLE TANDEM AXLE SPRING SUSPENSION

Filed July 8, 1953

INVENTOR.
Robert J. Walter
BY
Popp and Sommer
Attorneys.

March 29, 1955

R. J. WALTER 2,705,152

VEHICLE TANDEM AXLE SPRING SUSPENSION

Filed July 8, 1953

INVENTOR.
Robert J. Walter
BY
Popp and Sommer
Attorneys.

United States Patent Office 2,705,152
Patented Mar. 29, 1955

2,705,152
VEHICLE TANDEM AXLE SPRING SUSPENSION

Robert J. Walter, Kenmore, N. Y., assignor to Truck Equipment Co., Inc., Buffalo, N. Y., a corporation of New York Application July 8, 1953, Serial No. 366,740

7 Claims. (Cl. 280—104.5)

This invention relates to a tandem axle suspension particularly for trucks in which each axle is permitted to move against a resilient resistance both vertically and laterally relative to the vehicle frame.

General objects of the present invention are to provide a suspension (1) which will function to safely support the vehicle body at high speeds, both when loaded and unloaded; (2) which reduces and cushions both the vertical and lateral impacts from the axles against the body of the vehicle, both when the vehicle is loaded and unloaded; (3) in which side sway is reduced and in which periodic vibration of the suspension is dampened out and in which wheel tramp is avoided; (4) in which all forces are cushioned so as to increase gasoline and tire mileage; (5) which has light unsprung weight; (6) in which the metal stresses are within safe working limits of heat treated castings or forgings; (7) which can be produced at low cost and in particular requires only simple machining operations; (8) which can be easily taken down and repaired; (9) in which any desired degree or frequency of spring deflection can be obtained; (10) in which one or both of the tandem axles are self-steering so that when rounding a curve, one or both tandem axles are caused to assume such an angle relative to each other as will enable a pure rolling action to be obtained; (11) which includes compensating means connecting the companion ends of the tandem axles and through which the excess load on either axle is transmitted to the other axle; (12) in which the transfer of the load from the tandem axles to the front axle of the vehicle, under braking reaction, is identical with the similar transfer of the load in a two axle vehicle of the same wheel base, weight and load; (13) in which load carrying connections to the frame are intermediate the tandem axles thereby to reduce to a minimum any distortion of the suspension through weaving of the frame; (14) in which the connections to the frame are made principally to the longitudinal side bars thereof to simplify the installation of the suspension and design of the frame and suspension; and (15) which will stand up under conditions of severe and constant use with very little servicing.

An important specific object of the present invention is to provide a suspension having the above features in which, load transfer or axle compensation is obtained through elongated generally horizontal walking beam supporting members, preferably in the form of main leaf springs, have rocking connections with the frame at their centers and are connected at their ends to the ends of tandem axles so that load transfer from one axle to the other is effected directly through the elongated supporting members or walking beams.

A further important specific object of the present invention is to provide such a rocking mounting for the elongated supporting members or walking beams which will permit cushioned lateral axle movement, that is, movement of either of the axles lengthwise of its axis.

A further important object of the invention is to provide a control linkage or mechanism for resiliently limiting such lateral axle movement, and which includes springs of graduated resistance so that this cushioning is gradual.

Another most important specific object of the invention is to provide, in such a control linkage, simple and effective means for rendering the tandem axles self-steering, the lateral movement of either axle being translated by this control linkage into a slight turning movement of the axle about a vertical axis and in such direction as to cause the axle to track when making a turn without tire scuffing or loss of power.

Another important object of the present invention is to provide a simple linkage for obtaining such self-steering movement of the axles, these being in the form of links connecting each end of each axle with the frame and extending generally longitudinally of the frame but being angularly disposed with reference to each other to translate lateral movement of each axle into a turning movement thereof about a vertical central axis.

Other objects and advantages of the invention will be apparent from the following description and drawings in which:

Fig. 1 is a fragmentary top plan view of the rear end of the frame of a truck supported on tandem axles by a suspension embodying one form of my invention.

FIGS. 1–4a

Referring more particularly to the form of the invention shown in Figs. 1–4a, the invention is shown in connection with a highway truck, the frame 20 of which is shown as including a pair of main longitudinal side frame bars 21 of channel shape in cross section and arranged with their channels opposing each other. These longitudinal side frame bars 21 of the frame are joined at their rear extremities by a rear cross bar 22 which is also preferably channel shaped in cross section with its channel facing inwardly, and the corners formed by the longitudinal side frame bars 21 and this rear cross bar 22 being shown as reinforced by gusset plates 23.

Figure 4:
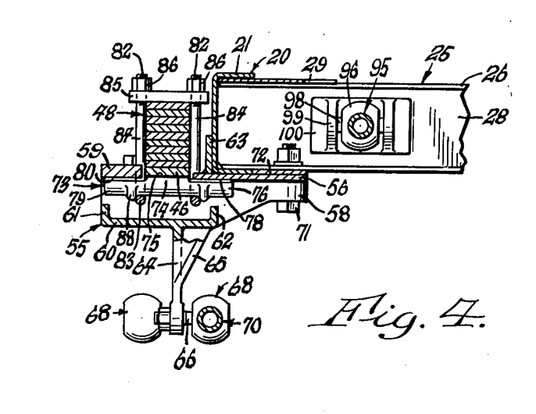
Fig. 4 is a fragmentary vertical transverse section taken generally on line 4—4, Fig. 2.
Figure 4A:
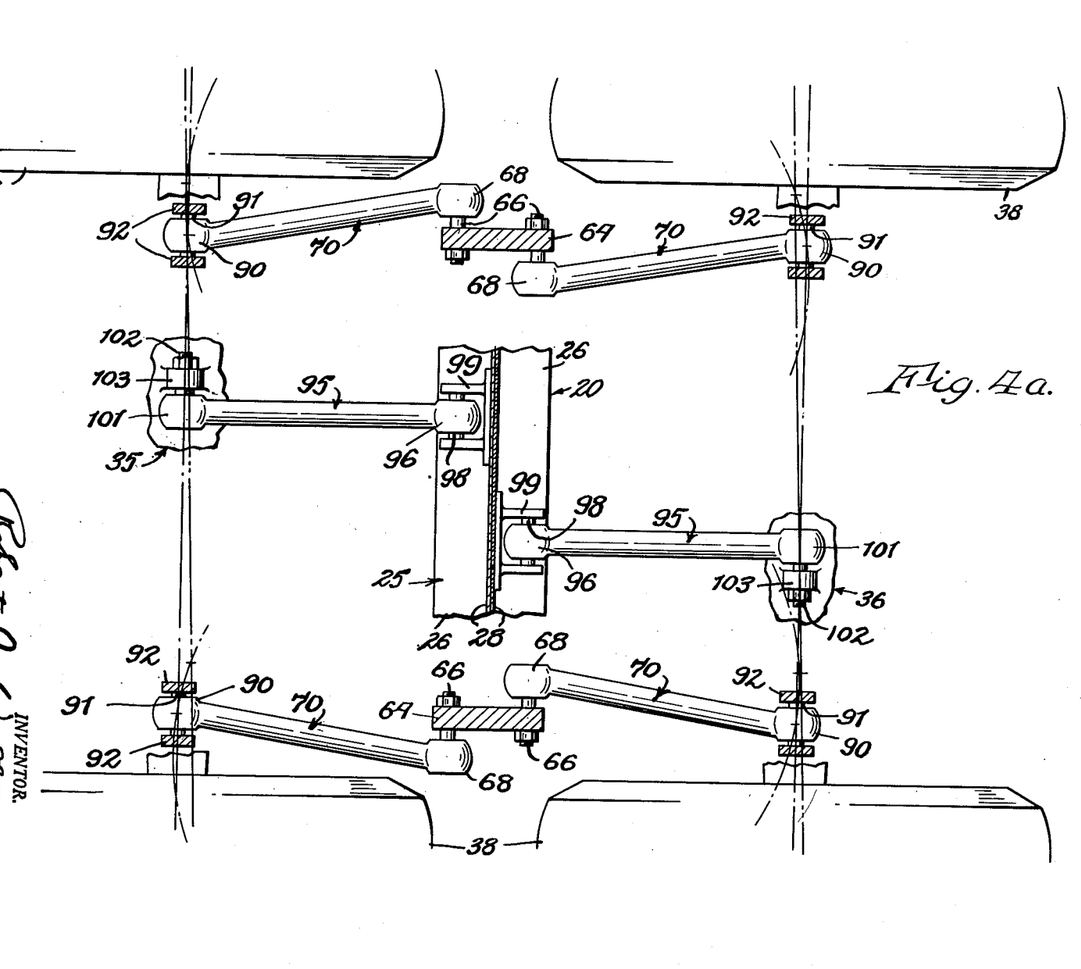
Fig. 4a is a fragmentary horizontal sectional view taken generally on line 4a—4a, Fig. 2.

In addition the truck frame 20 is provided centrally above the tandem axle assembly with a cross frame bar 25 which is preferably in the form of two channels 26, 26, arranged with their webs 28 back to back so as to form, in effect an I-beam. The ends of these cross channel members 26, 26 of the cross frame bar 25 project into the channels of the main longitudinal side frame bars 21 as shown in Figs. 1 and 4. The connections between this cross bar 25 and the longitudinal side frame bars 21 are reinforced by gusset plates 29. The frame can be additionally strengthened by cross bars 30 and the gusset plates 31.

Figure 2:
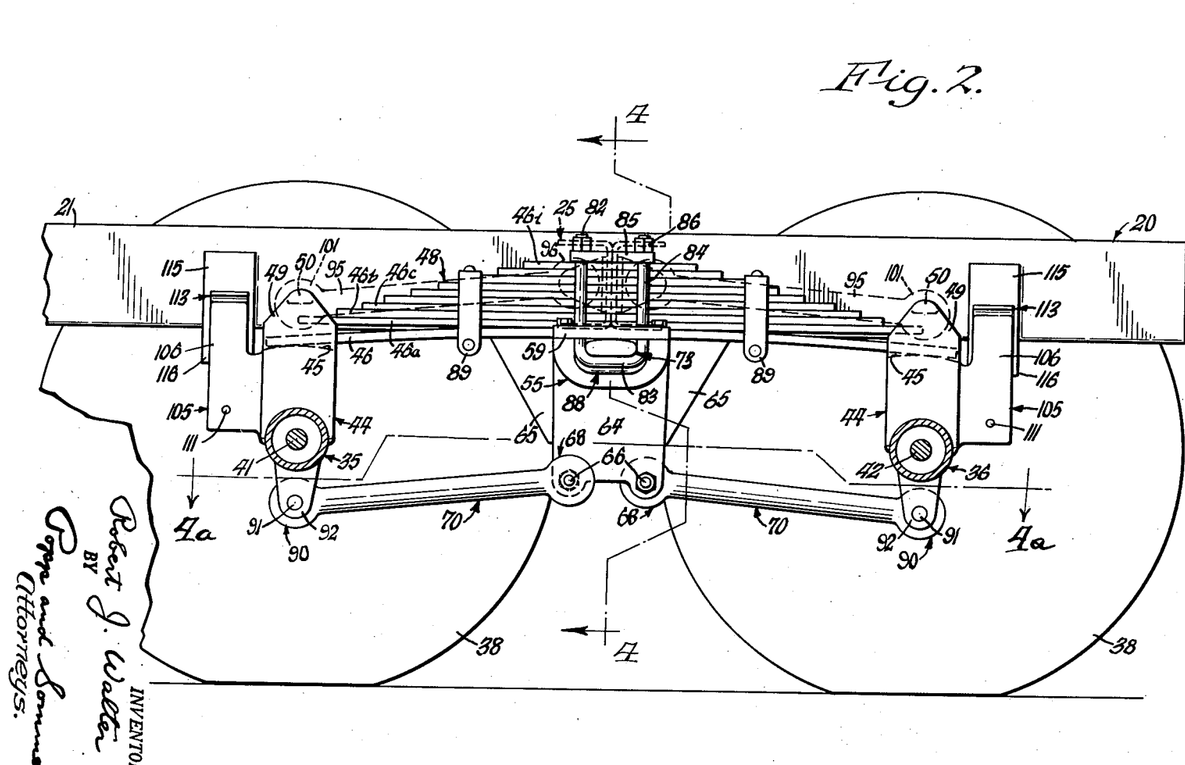
Fig. 2 is a vertical sectional view taken generally on line 2—2, Fig. 1.

The frame 20 is shown as supported by a pair of tandem axles 35 and 36 which are supported by wheels 38, these wheels being rotatably secured to these axles. One or both groups can be drive wheels, both axles being shown as provided for this purpose with differential housings 39, 40 through which power is transmitted to the drive axle shafts 41, 42 housed within the axles 35, 36 and which are secured to the wheels 38 in the usual and well known manner.

The construction of the tandem axle spring suspension at the left hand side of the truck is the same as the tandem axle spring suspension at the right hand side of the truck and hence a description of the spring suspension at one side of the truck will be deemed to apply to both sides, the same reference numerals being used.

On each end of each axle 35, 36 is mounted an axle bracket or stand 44 which is fast to and extends upwardly from the axle. Each axle bracket is preferably of rectangular form in horizontal section and its upper face 45 is of upwardly curving convex form, the axis of curvature being parallel with the axles.

The opposite ends of the lowermost leaf 46 of a conventional group 48 of main leaf springs rest on the convex upper faces 45 of the axle brackets or stands 44 at each side of the truck. While the structure 48 is shown as a conventional group of leaf springs, this structure functionally is a load transfer member and could be any elongated generally horizontal supporting member mounted to function as a walking beam. Accordingly each group 48 of leaf springs spans the distance between the corresponding ends of the tandem axles 35, 36 and is supported at its opposite ends thereon. The progressively higher leaves 46a, 46b, 46c, etc., are progressively shorter terminating in a short top plate 46i. Lateral outward or inward displacement of each end of each group 48 of leaf springs is prevented by a vertical side plate or upward extension 49 rising from the outside of each axle bracket or stand 44 and extending above the ends of the corresponding spring leaves 46, 46a. Each of these upward extensions 49 of each axle bracket also preferably has an inward extension 50 which extends over the corresponding end of the group 48 of leaf springs to limit upward displacement thereof.

The center of each group 48 of leaf springs has a rocking connection with the vehicle frame 20, this rocker mounting being preferably constructed as follows:

A frame bracket or casting, indicated generally at 55, is secured to each longitudinal side frame bar 21 to project outwardly therefrom and be supported by the corresponding group 48 of leaf springs. This frame bracket comprises a top rocker bearing plate 56 which is arranged against the under face of the corresponding longitudinal side frame bar 21, as best shown in Fig. 4, a pair of spaced generally parallel arms 58 formed integrally with the front and rear edges of the rocker bearing plate 56 and projecting outwardly from the frame, a rocker bearing bar 59 connecting the upper parts of the outer ends of these arms 58 and arranged in spaced relation to and with its under face in coplanar relation to the rocker bearing plate 56 and a lower cross web 60 connecting and strengthening the lower portions of the side arms 58 and also preferably reinforced by upstanding flanges 61 and 62. Additionally each of these main frame brackets 55 has welded to its rocker bearing plate 56 an upstanding plate or flange 63 which fits against the outer vertical face of the corresponding longitudinal side frame bar 21, as best shown in Fig. 4. Additionally each main frame bracket 55 has a vertical plate 64 depending therefrom and arranged parallel with the longitudinal side frame bars 21 and preferably reinforced by a triangular reinforcement 65, as best shown in Fig. 4. At its fore-and-aft lower corners this depending plate 64 is provided with transverse holes receiving the stems 66 of the ball members of universal joint 68 of self-steering control links or rods 70 which extend lengthwise of the frame 20 but are angularly disposed with reference to one another to effect self-steering of the tandem axles as hereinafter described in greater detail.

Each main frame bracket 55 can be removably secured to the bottom flanges of the cross frame bar 25 by bolts 71, a spacer or filler plate 72 being preferably inserted between these parts so as to form a continuation of the lower flange of the corresponding main longitudinal side frame bar 21, as best shown in Fig. 4.

A rocker, indicated generally at 73, engages the under faces of the flat rocker bearing plate 56 and the flat rocker bearing bar 59 and is secured to the center of the group 48 of leaf springs. For this purpose this rocker bar has a central slightly elevated part 74 with a flat upper face 75 engaging the central part of the lowermost leaf 46 of the group 48 of leaf springs. This rocker 73 also has a horizontal extension 76 projecting toward the truck frame with a rounded convex upper face or perch 78 engaging the under face of the flat rocker bearing plate 56. This rocker also has a horizontal extension 79 projecting away from the truck frame with a rounded convex upper face or perch 80 engaging the under face of the flat rocker bearing bar 59. The curvatures of the rounded convex upper faces or perches 78 and 80 of the extensions 76 and 79 have a common axis parallel with the axles 35, 36 so that the rocker 73 rocks in a direction to permit vertical movement in opposite directions of the opposite ends of the group 48 of leaf springs mounted thereon.

Each group of these leaf springs is secured to its rocker 73 by a pair of U-bolts 82, the cross part 83 of each of which, as best shown in Figs. 2 and 4, embraces the corresponding horizontal extension 76 or 79 of the rocker 73 and the upstanding legs 84 of which extend upwardly along the corresponding side of the group 48 of leaf springs and through holes in a top clamping plate 85. The nuts 86 of these U-bolts tighten this top clamping plate 85 against the group 48 of leaf springs to draw this group of leaf springs tightly against the flat upper seat 75 of the rocker 73. The cross parts 83 of the U-bolts 82 can be retained against slipping relative to the rockers 73 by ribs or beads 88 on these rockers.

The group 48 of leaf springs can additionally have the usual yokes 89 to prevent displacement of the leaves 46, 46a, etc.

As previously indicated, the self-steering control rods or links 70 are for the purpose of rendering the axles 35, 36 self-steering in rounding curves in the road or in steering the truck in overtaking another vehicle or avoiding some obstruction. For this purpose each of these links or rods is connected by a universal joint 90 to a cross pin 91 extending between a pair of ears 92 depending from each end of each axle. A particular feature of the invention is in the converging relation of these self-steering control links or rods 70 in a horizontal direction. Thus, as shown in Fig. 1, these self-steering control links or rods 70 for each axle 35 or 36 converge forwardly toward the center of the truck, or toe in. By this toeing in relation, lateral movement of either axle 35 or 36, that is, in a direction lengthwise of its axis, in effect, lengthens one of its self-steering control rods or links 70 and, in effect, shortens the other so as to turn the axle about a vertical central axis.

Each axle 35, 36 is also connected to the frame 20 by a radius rod 95, these radius rods preferably being arranged in parallel vertical planes parallel with the longitudinal side frame bars 21 of the truck frame, as best shown in Fig. 1, but being arranged in generally horizontal planes which are parallel with the self-steering control links or bars 70, as best shown in Fig. 2, so as to form vertically movable parallelograms with these self-steering control links or rods 70. In the normal loaded condition of the truck, all of these links or rods 70 and 75 preferably incline downwardly from their connection with the frame to their connection with the axles, as best shown in Fig. 2.

The connection of each of the radius rods 95 with the frame is through a universal joint 96 including a cross pin 98 anchored in a pair of ears 99 projecting horizontally from a bracket 100 attached to the corresponding vertical web 28 of the cross bar 25. The attachment of each of these radius rods 95 to each axle 35 or 36 is through a universal joint 101 including a pin 102 fast to an ear 103 rising from and integral with the corresponding axle.

Figure 3:
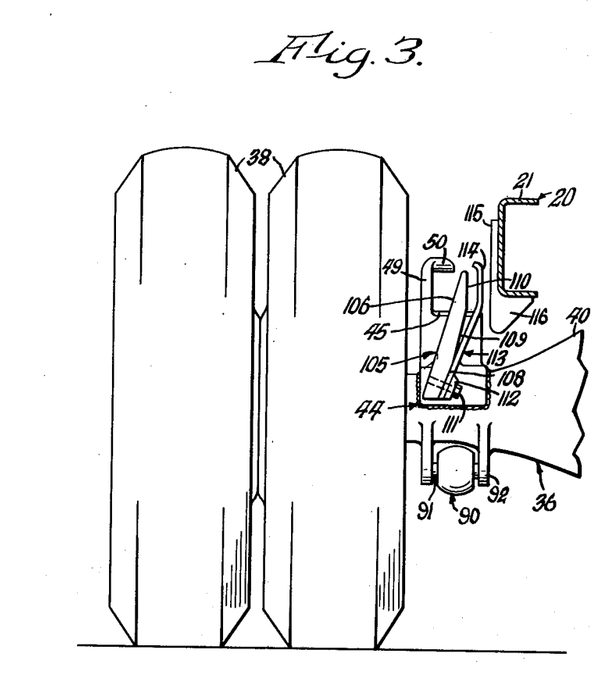
Fig. 3 is a fragmentary transverse sectional view taken generally on line 3—3, Fig. 1, the main leaf spring being omitted for clarity.

Means are provided for yieldingly limiting the maximum amount of lateral movement of either axle 35 or 36 with reference to the frame in either direction. These means are preferably constructed as follows:

Formed integrally with each axle bracket or stand 44 and projecting outwardly therefrom in a direction lengthwise of the frame 20 is a spring bracket 105. This spring bracket 105 has an upward extension 106 and that face of each spring bracket 105 and its upward extension 106 which opposes the vehicle frame 20 is shaped as shown in Fig. 3. This face comprises a lower angular face 108 which projects upwardly and inwardly toward the adjacent side frame bar 21; an intermediate face 109 which rises at a steeper angle; and an upper face 110 which is substantially vertical.

To the lower inclined face 108 is secured, as by a screw 111 and a backing plate 112, a leaf spring 113. Each of these leaf springs comprises a lower portion parallel with and secured against the lower inclined face 108 of the spring bracket 105 and an upper vertical portion 114 which is arranged alongside of the corresponding longitudinal side frame bar 21. Under extreme movement of the axle laterally of the frame in a corresponding direction the upper vertical part 114 of each leaf spring 113 engages a wear plate 115 secured to the adjacent longitudinal side frame bar 21. Preferably, as best shown in Fig. 3, each of these wear plates has a downward extension 116 which projects under and is secured to the lower flange of the adjacent longitudinal side frame bar 21.

*Operation of Figs. 1–4a*

In the operation of the form of the invention shown in Figs. 1–4a, the upward movement of one end of, say, the front axle 35 through its axle bracket or stand 44 moves the front end of the corresponding group 48 of leaf springs upwardly. This upward pressure is transmitted through the clamping plate 85 and U-bolts 82 at the center of this group 48 of leaf springs to the horizontal opposite extensions 76 and 79 of the rocker 73. This upward pressure is transmitted by the curved upper faces 78 and 80 of these extensions 76 and 79 to the flat rocker bearing plate 56 (Fig. 4) and the flat rocker bearing bar 59. The upward pressure against the flat rocker bearing plate 56 is transmitted directly to the underside of the corresponding main longitudinal side frame bar 21 of the frame 20, and the upward pressure against the flat rocker bearing bar 59 is transmitted through the side arms 58 of the main frame bracket 55 similarly to the corresponding main longitudinal frame side bar 21.

The upward movement of the front end of the group 48 of leaf springs causes the curving surfaces 78 and 80 of the extensions 76 and 79 of its rocker 73 to rock on the under surfaces of the flat rocker bearing plate 56 and the flat rocker bearing bar 59. This rocking or pivoting of the center of the group 48 of main leaf springs causes a downward pressure to be transmitted by the rear end of this group of main leaf springs to the axle bracket or stand 44 of the rear axle 36. Accordingly the upward movement of one end of the front axle 35 is transmitted through the group 48 of main leaf springs as a downward pressure on the corresponding end of the rear tandem axle 36 thereby to equalize the load upon the two axles and effect so-called load transfer or axle compensation.

A feature of the invention resides in permitting a controlled movement of the tandem axles laterally, that is, in the direction of their axes, in either direction. Thus, when an axial force is impressed, say, on the front axle 35 so as to shift it laterally, this force is transmitted through its axle brackets or stands 44 to the front ends of the two groups 48 of main leaf springs. This causes a slight turning movement of the centers of these groups of main leaf springs about vertical axes, this turning of these groups of springs in a horizontal direction being permitted by the rounding upper faces 78 and 80 of the extensions 76 and 79 of the rockers 73 to which the groups of springs are secured.

The amount of such permitted lateral movement of either tandem axle is resiliently limited. Thus, with sufficient lateral movement of either axle its upstanding spring leaf 113, as best shown in Fig. 3, engages the wear plate 115 at the corresponding side of the vehicle. At the maximum permitted movement of the axle this upstanding leaf spring 113 is backed against the face 110 at the upper end of its bracket 105 thereby to prevent overstressing of the spring 113 as well as to positively limit the maximum amplitude of lateral movement of each axle with reference to the frame in either direction.

An important feature of the invention resides in the control linkage or mechanism connecting each end of each axle with the frame so as to effect a self-steering action of both tandem axles. This self-steering of the tandem axles is obtained through the angularity, in a horizontal direction, of the self-steering control links or rods 70 which, through universal joints, connect the ends of the tandem axles 35 and 36 with the main frame.

Thus, when the vehicle makes a turn in the road, the tires of each of the axles 35, 36 tend to resist the scuffing which otherwise would occur and in doing so push each axle laterally of the frame to eliminate this scuffing. Confining our attention to, say, the front tandem axle 35, this lateral or axial movement on making a turn causes the self-steering control links or rods at its opposite ends to swing about the universal joints 68 which anchor them to the frame and to swing in a corresponding direction, that is, one of these control links or rods 70 will swing out and the other self-steering control link or self-steering rod 70 will swing in but both will rotate in the same angular direction about the universal joints 68. Since these self-steering control links or rods 70 toe in in a horizontal direction toward the front of the frame, that self-steering control link 70 swinging in toward the frame will, in effect, shorten and move the corresponding end of the axle 35 rearwardly with reference to the frame. The self-steering control link or rod 70 at the opposite end of this front axle, and which is swinging outwardly from the frame, in effect, lengthens and moves the corresponding end of the front tandem axle 35 forwardly.

Similarly with lateral movement of the rear tandem axle 36, because of the toeing in angularity of the self-steering control links or rods 70, the self-steering control link 70 swinging toward the frame 20 will in effect lengthen and move the corresponding end of the rear tandem axle 36 rearwardly while the self-steering control link 70 at the other end of the rear tandem axle 36 and swinging away from the frame 20 will, in effect, shorten and draw the corresponding end of the rear tandem axle 36 forwardly.

It will therefore be seen that such endwise displacement of each tandem axle will cause a corresponding fore-and-aft displacement of the opposite ends thereof. This fore-and-aft displacement of the two tandem axles 35 and 36 is such that in rounding a curve and with such endwise displacement of the axles 35 and 36 to avoid tire scuffing both of the tandem axles are caused to steer in the direction to correspond to the turn being made by the truck. Thus, when the truck is steered to the right the lateral movement of its two tandem axles 35, 36 as above described, causes the outboard ends of these two axles to move forwardly and the inboard ends thereof to move rearwardly, such movement bringing the tandem axles to move to such oblique position relative to each other as will cause their axes to intersect the axes of rotation of the two front or steering wheels (not shown) of the truck and thereby enable the truck to make the turn without tire scuffing. This action occurs when either the vehicle is steered around a long turn in the road or when it is steered sharply on a straight road, as for instance, when overtaking a slow vehicle ahead or otherwise avoiding some obstruction. It will also be seen that this self-steering action takes place to some extent when a tendency to tire scuffing occurs because of one wheel or a pair of wheels having a diameter different from the diameter of the wheel or pair of wheels at the other end of the same axle.

The two axles 35 and 36 are held against rotation by the radius rods 95 which connect their central parts, adjacent the differential housings 39, 40 with the frame cross bar 25. It will be noted that these radius rods 95 lie in generally horizontal planes which are parallel with the corresponding pair of self-steering control links or rods 70 and that hence, for vertical axle movement, these radius rods are in parallelogram relation with the self-steering control rods or links 70. Since the radius rods 95 are secured to the upper sides of the axles 35, 36 and since the self-steering control links or rods 70 are secured to the undersides of the axles 35, 36, these rods prevent rotation of the axles and at the same time permit vertical movement thereof.

Figure 5:
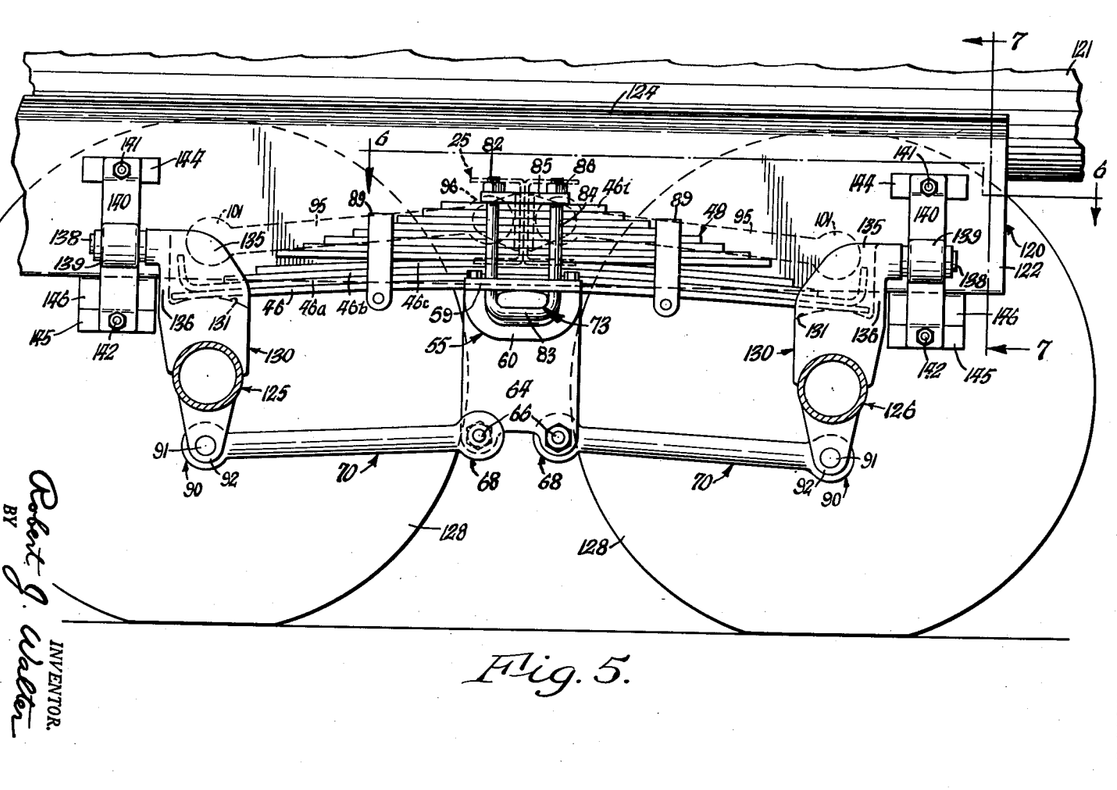
Fig. 5 is a view similar to Fig. 2 and showing a modified form of the invention.
Figure 6:
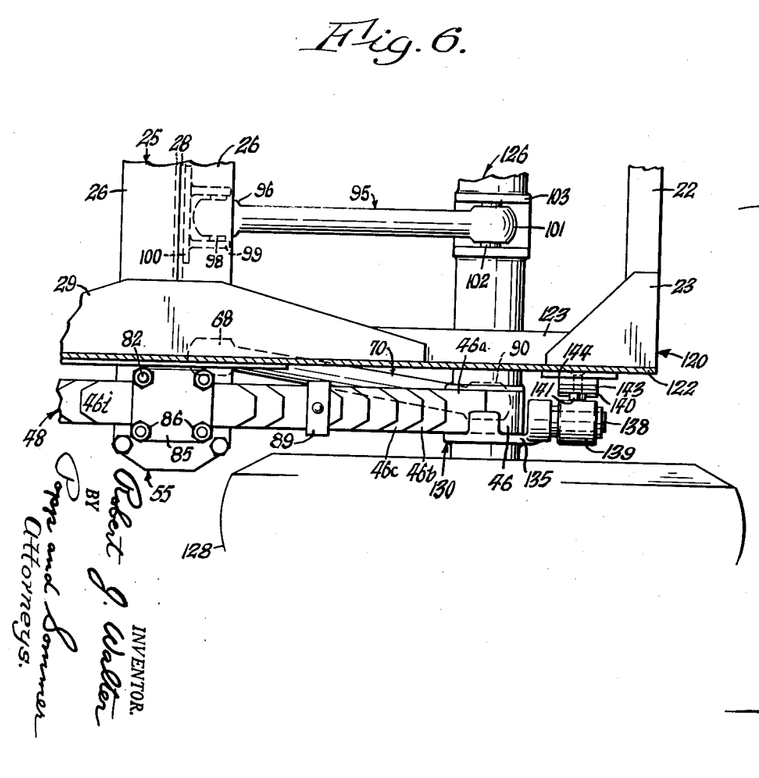
Fig. 6 is a fragmentary horizontal sectional view taken generally on line 6—6, Fig. 5.
Figure 7:
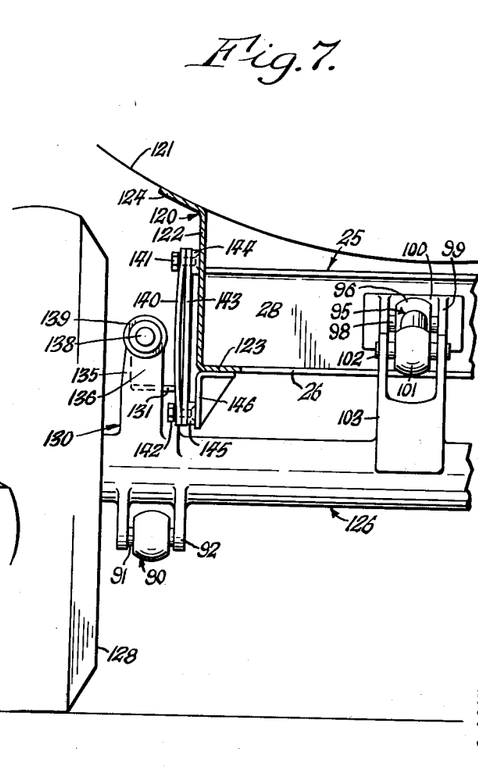
Fig. 7 is a fragmentary vertical transverse section taken generally on line 7—7, Fig. 5, the main leaf spring being again omitted for clarity.

*FIGS 5–7*

In the modified form of the invention shown in Figs. 5–7 the vehicle frame 120 is of substantially the same construction as the vehicle frame 20 of the form of the invention shown in Figs. 1–4a except that it is designed to support a cylindrical tank 121 so that the main longitudinal side frame bars 122, instead of being in the form of inwardly facing channels, as with the main longitudinal side frame bars 21 of the form of invention shown in Figs. 1–4a are Z-shaped in section, having lower horizontal opposing flanges 123 and an upper outwardly extending flange 124 which fits the underside of the tank 121. The rear cross bar 22 and intermediate cross bar 25 are the same construction as in the form of the invention shown in Figs. 1–4a and hence the same reference numerals have been applied and the description is not repeated.

In the form of the invention shown in Figs. 5–7 the frame 120 is shown as supported by a pair of tandem axles 125 and 126, which are supported by wheels 128, these wheels being rotatably secured to these axles. The axles are assumed to be for a trailer and hence neither of the axles 125, 126 have differential housings nor drive axle shafts as with the form of the invention shown in Figs. 1–4a.

On each end of each axle 125, 126 is mounted an axle bracket or stand 130 which is fast to and extends upwardly from the axle. Each axle bracket or stand is preferably of rectangular form in horizontal section and its upper face 131 is of upwardly curving convex form, the axis of curvature being parallel with the axles.

These upper convex faces 131 of the axle brackets 130 at each side of the vehicle support a group 48 of leaf springs which are identical in construction to the group of leaf springs in the form of the invention shown in Figs. 1–4a and are connected to the frame through a similar rocker 73 and main frame bracket 55. Since each group 48 of main leaf springs and its connection with the frame is identical with Figs. 1–4a, this description is not repeated and the same reference numerals have been employed.

Also, as with the form of the invention shown in Figs. 1–4a each end of each axle is connected to the depending plate 64 of the main frame bracket 55 by steering control links or rods 70 which toe in or converge toward the front of the main frame 120. Also each axle 125, 126 is connected near its center and through universal joints 96 and 101 by a radius rod 95 to the cross beam 25 of the frame. Since the construction, operation and mounting of these rods 70 and 95 is identical to that shown in Figs. 1–4 the description is not repeated and the same reference numerals have been employed.

The essential distinction of the modified form of the invention shown in Figs. 5–7 resides in the means for resiliently resisting lateral movement of either axle 125 or 126, this means being preferably constructed as follows:

Each axle bracket 130, in addition to an upwardly extending flange 135 flanking the outside of the corresponding end of the group 48 of main leaf springs also has a wall 136 projecting from one end of the flange 135 toward the main frame 120 and arranged on that side of the axle bracket remote from the group 48 of leaf springs. This wall 136 of each axle bracket 130 carries a pin 138 on which a roller 139 is mounted, the axes of these pins being parallel with the main longitudinal side frame bars 122. These rollers are positioned to engage a flat spring 140 which is vertically disposed and secured at its upper and lower ends to the corresponding main longitudinal side frame bar 122 by upper and lower screws 141 and 142. Each spring 140 bulges outwardly from a backing plate 143 and the bolts 141, 142 extend through the backing plates 143 and into horizontal anchoring blocks or bars 144, 145, the upper one of which is suitably welded to the corresponding main longitudinal side frame bar 122 while the lower one of which is welded to an L-shaped bracket 146 projecting downwardly from the lower flange 123 of the same main longitudinal side frame bar.

It will be seen that the form of the invention shown in Figs. 5–7 is identical with the operation of the form of the invention shown in Figs. 1–4a except for the action of the springs 140 and rollers 139 in limiting the maximum amplitude of lateral axle movement. When either axle 125 or 126 moves laterally toward its extreme permitted amplitude the roller 139 at one end of the axle engages the companion spring 140. This causes a compression of the spring thereby to yieldingly resist further lateral movement of the axle in a corresponding direction. When that spring 140 is flattened against its backing plate 143 further movement of the axle is prevented thereby to provide a positive stop for such lateral axle movement and thereby to prevent overstressing of any of the springs 140.

Figure 8:
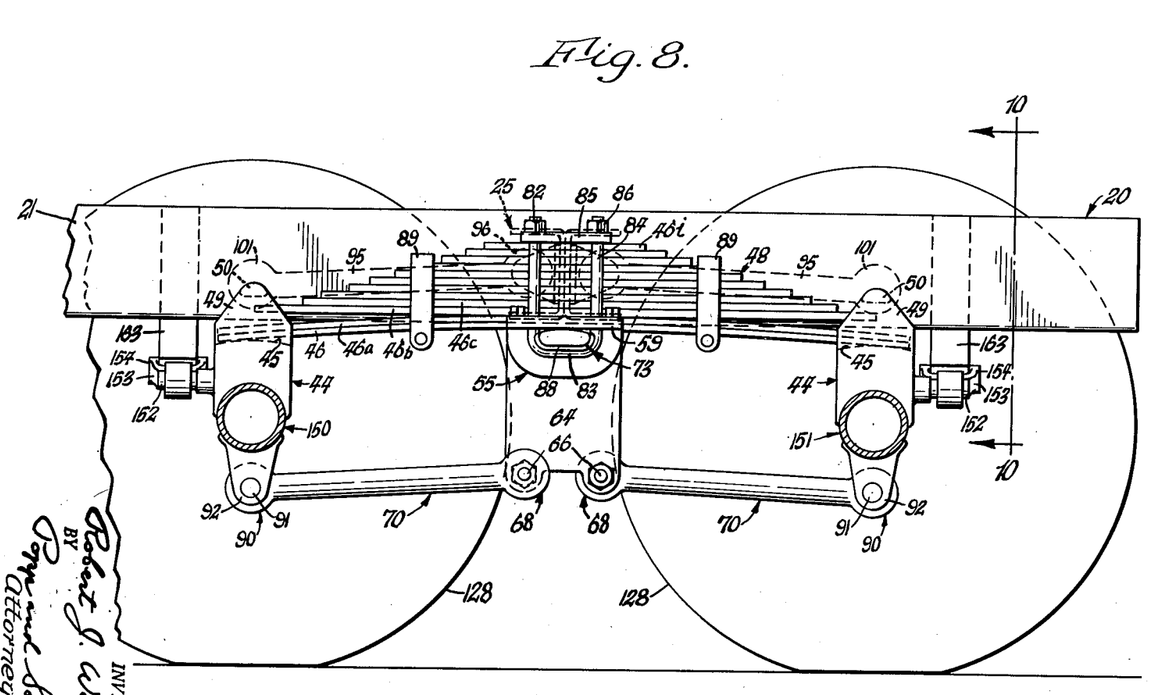
Fig. 8 is a vertical longitudinal section similar to Figs. 2 and 5 and showing a further modified form of my invention.
Figure 9:
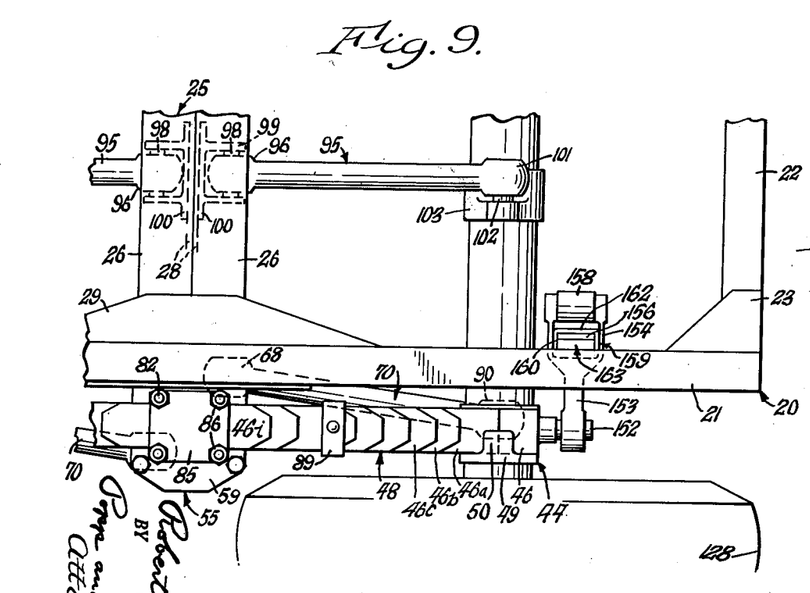
Fig. 9 is a fragmentary top plan view, similar to Fig. 1 of the form of the invention shown in Fig. 8.
Figure 10:
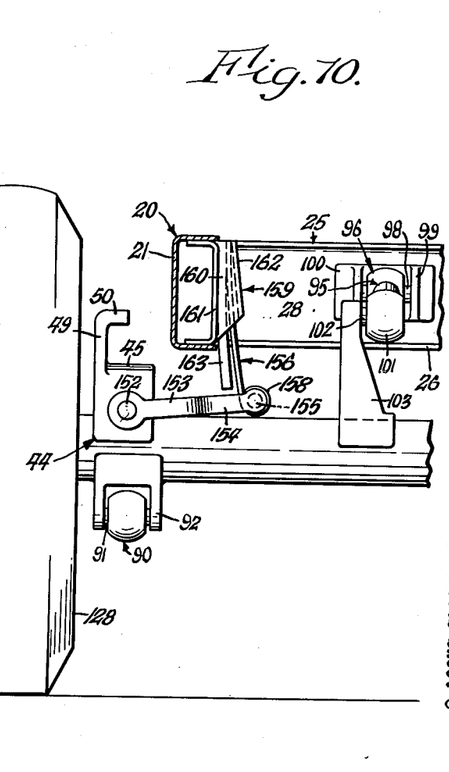
Fig. 10 is a fragmentary vertical transverse section taken generally on line 10—10, Fig. 8, the main leaf spring being again omitted for clarity.
Figure 11:
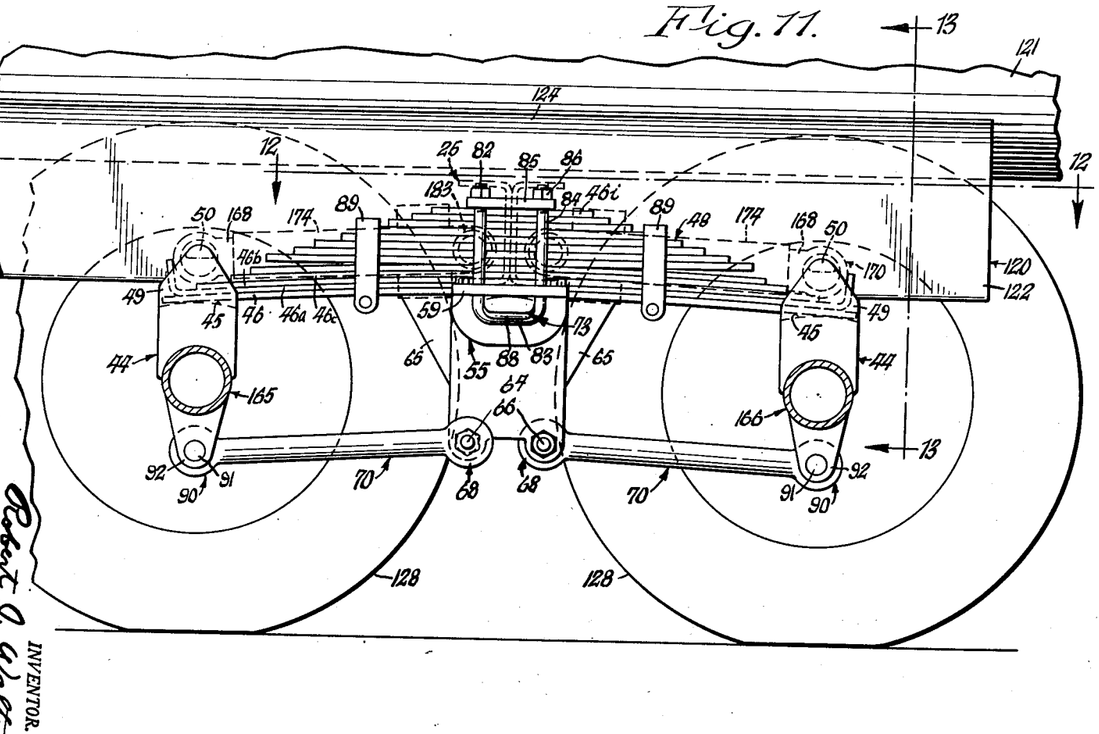
Fig. 11 is a vertical fore-and-aft section similar to Figs. 2, 5 and 8 and showing a still further modified form of the present invention.

FIGS. 8–10

The form of the invention illustrated in Figs. 8–10 essentially illustrates another form of means for resiliently limiting the maximum amplitude of lateral movement of the tandem axles.

The frame 20 is identical with that of the form of the invention shown in Figs. 1–4a and hence the same description applies and the same reference numerals have been used. The axles 150, 151 differ from the form of the invention shown in Figs. 1–4a only in that they are not drive axles and hence do not have differential housings nor drive axle shafts. The axle brackets 44, group 48 of main leaf springs, main frame brackets 55, rockers 73, self-steering control links or rods 70 and radius rods 95 are all identical with the form of the invention shown in Figs. 1–4a and hence the same description applies and the same reference numerals have been used.

The distinguishing feature of the form of the invention illustrated in Figs. 8–10 resides in the provision of a horizontal pin 152 projecting parallel with the longitudinal frame side bars 21 from the side of each axle bracket or stand 44 remote from the group 48 of main leaf springs. Each pin 152 pivotally carries a link 153 which extends horizontally under the adjacent longitudinal frame side bar 21 and at its other end is bifurcated, as illustrated at 154, Fig. 9, and carries a cross pin 155 across the fork or bifurcations. A leaf spring 156 is provided with an eye 158 at its lower end which embraces this pin 155. The upper end of this leaf spring projects into a U-shaped frame bracket 159. The side legs or flanges 160 of this frame bracket project toward the adjacent main longitudinal frame side bar 21 and are welded at their edges to the back of a channel 161 fitted and welded in the channel of this main longitudinal frame side bar 21, as best illustrated in Fig. 10. The back 162 of the U-shaped frame bracket 159 inclines so as to provide a larger mouth at the bottom of this bracket than at the top thereof. A spring backing plate 163 is also arranged in each frame bracket 159 to project downwardly therefrom. This backing plate is interposed between the leaf spring 156 and the channel 161 and can be secured in place in any suitable manner. This backing plate 163 can also be in the form of a leaf spring but of much heavier cross section than the leaf spring 156.

The operation of this form of the invention, except for the action of the link 154 and leaf spring 156 is identical with that of Figs. 1–4a and hence will not be repeated. When each axle 150, 151 approaches the limit of its lateral movement in either direction the link 154 on one end is drawn toward the backing plate 163 thereby to provide an initial light resistance to such extreme lateral movement of the axle. On fully engaging the backing plate 163, this initial light resistance ceases and further resistance is that offered by the backing plate or heavy spring 163 in combination with the leaf spring 156. The combination positively limits the maximum amplitude of lateral axle movement and prevents overstressing of the leaf springs 156.

FIGS. 11–14

The form of the invention illustrated in Figs. 11–14 again essentially illustrates another form of means for resiliently limiting the maximum amplitude of lateral movement of the tandem axles.

The frame 120 is identical with that of the form of the invention shown in Figs. 5–7 and hence the same description applies and the same reference numerals have been used. The axles 165, 166 differ from the form of the invention shown in Figs. 1–4a only in that they are not drive axles and hence do not have differential housings nor drive axle shafts. The axle brackets 44, group 48 of main leaf springs, main frame brackets 55, rockers 73 and self-steering control links or rods 70 are all identical with the form of the invention shown in Figs. 1–4a, and hence the same description applies and the same reference numerals have been used.

Figure 14:
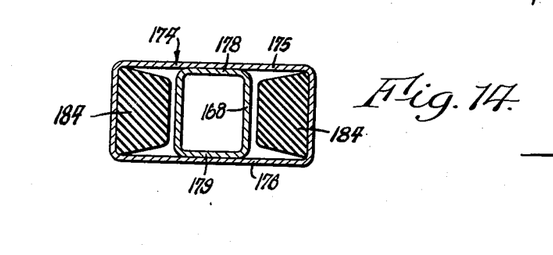
Fig. 14 is an enlarged transverse section taken on line 14—14, Fig. 12.

The distinguishing feature of this modification is that the radius rods 168, which correspond to the radius rods 95 of the forms of the invention previously illustrated also serve as part of the mechanism for resiliently restraining maximum lateral axle movement. To this end one end of each of these radius rods 168 is connected by a cross pin 169 forming one part of a universal joint 170 to the upstanding ears 171 of a bracket 172 on the central part of each tandem axle 165 and 166. The body or shank of each radius rod 168 is also preferably rectangular in cross section as illustrated in Fig. 14. The other end of each radius rod 168 projects into the open end 173 of a tube 174 which, as illustrated in Fig. 14, is rectangular in cross section with a greater horizontal than vertical dimension and with its upper and lower walls 175 and 176 closely fitting the upper and lower walls 178 and 179 of the radius rod 168. The housed end of each radius rod 168 is secured to the inner end of the tube 174 by a vertical pivot 180 and this end of the tube 174 is fast to the central part of a cylindrical cross tube 181 which latter is disposed inside of the corresponding channel 26 which forms part of the frame cross beam 25. The opposite ends of each of these cylindrical cross tubes 181 are each connected by a pivot pin 182 to a bearing 183 secured to the vertical web of the corresponding channel 26.

Figure 12:
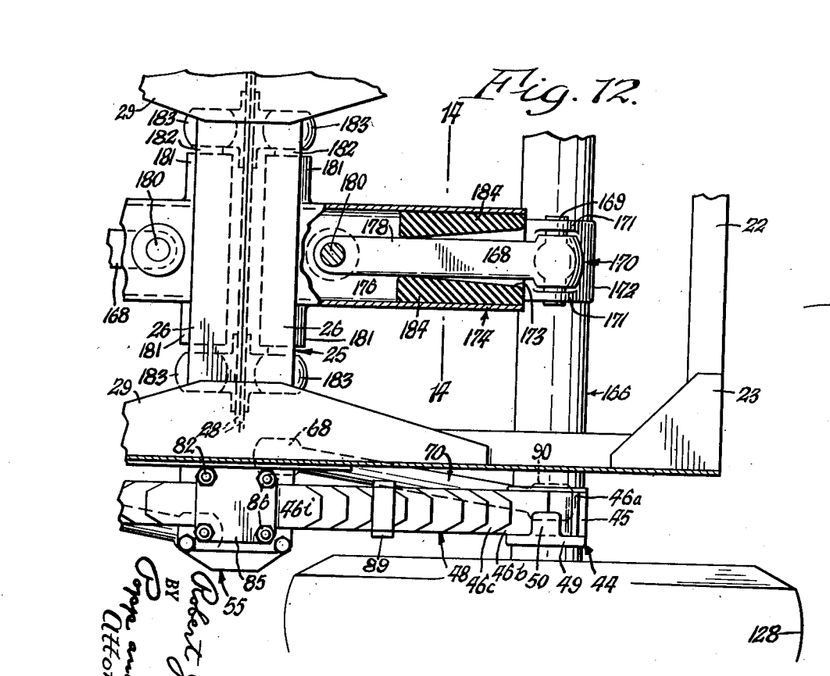
Fig. 12 is a horizontal section, with parts broken away, taken generally on line 12—12, Fig. 11.
Figure 13:
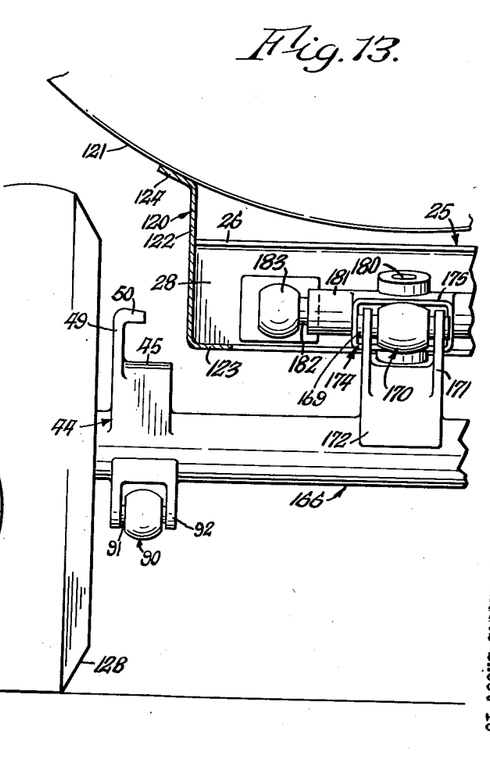
Fig. 13 is a vertical transverse section taken generally on line 13—13, Fig. 11, the main leaf spring being again omitted for clarity.

The resilient resistance to lateral axle movement is provided by a pair of resilient rubber blocks 184 in opposite sides of each tube 174 in the line of horizontal movement of the radius rod 168. These blocks each preferably have their upper and lower faces tapering toward the radius rod 168 as illustrated in Fig. 14 and also are preferably wedge-shaped in horizontal section, as illustrated in Fig. 12, with their small ends toward the open mouth 173 of the tube 174 so as to accommodate the greater amplitude of swing of the end of the radius rod 168 projecting from the tube 174.

It will be seen that when either axle 165 or 166 moves laterally far enough its radius rod 168 will engage the corresponding rubber block 184 which provides a cushioned limit stop to such lateral movement. It will further be seen that the tubes 174 provide, in effect, a large universal joint connecting each radius rod 168 with the frame and in which provision is made for resiliently limiting the horizontal action of the radius rod and hence its axle.

From the foregoing it will be seen that the various forms of the present invention provide a very simple tandem axle suspension which employs a heavy duty leaf spring but in such manner as to provide both axle compensation or load transfer from one tandem axle to the other and also to permit lateral movement of the two tandem axles. It will further be seen that a simple control linkage is provided at each end of each axle to render the tandem axles self-steering in making a turn in the road and to aline the axles with each other when going straight ahead, tire scuffing, as well as loss of power, being thereby avoided. It will also be seen that a number of simple and effective resilient devices are provided for yieldingly limiting the maximum amplitude of lateral axle movement without danger of overstressing the resilient elements.

As previously indicated, while the structure 48 is desirably in the form of a leaf spring, it is essentially a load transfer supporting member or walking beam and the resilience for the suspension could be supplied elsewhere.

I claim:

1. A tandem axle vehicle suspension adapted to be interposed between a vehicle frame and a pair of tandem axles each having wheels journalled thereon, comprising a frame bracket secured to each side of said frame intermediate said tandem axles and having a downwardly facing bearing face, an elongated, generally horizontal supporting member arranged adjacent each axle bracket and having at its center an upwardly facing bearing face forming a perch engaging and supporting the corresponding downwardly facing bearing face, one of said bearing faces being curved differently from the other bearing face to permit rocking of each of said elongated supporting members on an axis parallel with said axles, means movably supporting the opposite ends of each of said elongated supporting members on the corresponding tandem axles and permitting movement of each elongated supporting member about a vertical central axis to permit movement of said axles laterally with reference to said frame, a pair of generally horizontal self-steering control links associated with each of said axles and extending lengthwise of said vehicle frame, a pivot joint connecting one end of each of said self-steering control links with a companion axle, and a pivot joint connecting the opposite end of each of said self-steering links with said frame, said pivot joints being so disposed that in the centered position of said frame and axles the pair of self-steering control links of each axle converge forwardly whereby movement of said axles laterally of said frame is translated into a turning movement of said axles about a vertical central axis.

2. A tandem axle vehicle spring suspension adapted to be interposed between a vehicle frame and a pair of tandem axles each having wheels journalled thereon, comprising a frame bracket secured to each side of said frame intermediate said tandem axles and having a downwardly facing bearing face, an elongated, generally horizontal supporting member arranged adjacent each axle bracket and having at its center an upwardly facing bearing face forming a perch engaging and supporting the corresponding downwardly facing bearing face, one of said bearing faces being curved differently from the companion bearing face to permit rocking of said each of said elongated supporting members on an axis parallel with said axles, means connecting the opposite ends of each of said elongated supporting members with the corresponding tandem axles and permitting movement of each elongated supporting member about a vertical central axis to permit movement of said axles laterally with reference to said frame, a pair of generally horizontal self-steering control links associated with each of said axles and extending lengthwise of said vehicle frame, a pivot joint connecting one end of each of said self-steering control links with a companion axle, a pivot joint connecting the opposite end of each of said self-steering links with said frame, said pivot joints being so disposed that in the centered position of said frame and axles the pair of self-steering control links of each axle converge forwardly whereby movement of said axles laterally of said frame is translated into a turning movement of said axles about a vertical central axis, a radius rod associated with each of said axles and extending lengthwise of said vehicle frame, a pivot joint connecting one end of each radius rod with each axle at an elevation different from but in generally vertical alinement, transversely of the vehicle, with said pivot joints between that axle and the companion pair of self-steering control links, and a pivot joint connecting the other end of each radius rod with said frame and with said last pivot joint generally in vertical alinement, transversely of the vehicle, with the pivots connecting the companion pair of self-steering control links with said frame and each of said radius rods being of substantially the same effective length as the companion pair of self-steering control links whereby said radius rods and control links form vertically movable parallelogram linkages between the axles and the frame.

3. A tandem axle vehicle suspension adapted to be interposed between a vehicle frame and a pair of tandem axles each having wheels journalled thereon, comprising a frame bracket secured to each side of said frame intermediate said tandem axles and having a downwardly facing bearing face, an elongated, generally horizontal supporting member arranged adjacent each axle bracket and having at its center an upwardly facing bearing face engaging and supporting the corresponding downwardly facing bearing face, each of said bearing faces being curved differently from the companion bearing face to permit rocking of each of said elongated supporting members on an axis parallel with said axles, means movably supporting the opposite ends of each of said elongated supporting members on the corresponding tandem axles and permitting movement of each elongated supporting member about a vertical central axis to permit movement of said axles laterally with reference to said frame, and a stop interposed between said frame and each axle and limiting the said movement of said axles laterally with reference to said frame.

4. A tandem axle vehicle suspension adapted to be interposed between a vehicle frame member and a pair of tandem axle members each having wheels journalled thereon, comprising a frame bracket secured to each side of said frame intermediate said tandem axles and having a downwardly facing bearing face, an elongated, generally horizontal supporting member arranged adjacent each axle bracket and having at its center an upwardly facing bearing face engaging and supporting the corresponding downwardly facing bearing face, each of said bearing faces being curved differently from the companion bearing face to permit rocking of each of said elongated supporting members on an axis parallel with said axles, means movably supporting the opposite ends of each of said elongated supporting members on the corresponding tandem axles and permitting movement of each elongated supporting member about a vertical central axis to permit movement of said axles laterally with reference to said frame member, and a stop interposed between said frame member and each axle member to limit said movement of said axles laterally with reference to said frame and comprising a vertical spring leaf secured to one of said last members and projecting toward the other member, and a stop member on the other of said last members and arranged in the path of said spring leaf.

5. A tandem axle vehicle suspension adapted to be interposed between a vehicle frame member and a pair of tandem axle members each having wheels journalled thereon, comprising a frame bracket secured to each side of said frame intermediate said tandem axles and having a downwardly facing bearing face, an elongated, generally horizontal supporting member arranged adjacent each axle bracket and having at its center an upwardly facing bearing face engaging and supporting the corresponding downwardly facing bearing face, each of said bearing faces being curved differently from the companion bearing face to permit rocking of each of said elongated supporting members on an axis parallel with said axles, means movably supporting the opposite ends of each of said elongated supporting members on the corresponding tandem axles and permitting movement of each elongated supporting member about a vertical central axis to permit movement of said axles laterally with reference to said frame member, and spring means interposed between said frame member and each axle member and comprising a vertical spring leaf secured to one of said last members and projecting toward the other member, a stop on the other of said last members and arranged in the path of said spring leaf, and a backing plate for said spring leaf and secured to said one of said last members to prevent overstressing of said spring leaf.

6. A tandem axle vehicle suspension adapted to be interposed between a vehicle frame and a pair of tandem axles each having wheels journalled thereon, comprising spring means yieldingly supporting said frame on said axles and permitting movement of said axles laterally of said frame, and means limiting such lateral movement of each of said axles relative to said frame, comprising spaced links pivoted on each of said axles to swing about an axis perpendicular to the axle and projecting under said frame, a leaf spring pivotally secured at one end to the inner end of each of said links, and means anchoring the other end of said leaf spring on said frame.

7. A tandem axle vehicle suspension adapted to be interposed between a vehicle frame and a pair of tandem axles each having wheels journalled thereon, comprising spring means yieldingly supporting said frame on said axles and permitting movement of said axles laterally of said frame, and means limiting such lateral movement of each of said axles relative to said frame, comprising a tube associated with each of said axles and extending lengthwise of said frame with an open end projecting toward the companion axle, a pivot joint between the opposite end of each tube and said frame, the axis of each of which pivot joints is horizontal and transverse of said frame, a link extending into said open end of said tube, a universal joint connecting the outer end of said link with the companion axle, a vertical pivot connecting the inner end of said link with said tube, and blocks of rubber in said tube and flanking the side portions of said link intermediate its ends to limit the horizontal swinging movement of said link with reference to said frame.

References Cited in the file of this patent

UNITED STATES PATENTS

| 1,743,892 | Hylton | Jan. 14, 1930 |
| 1,946,060 | Buckendale | Feb. 6, 1934 |
| 2,139,937 | Collender | Dec. 13, 1938 |
| 2,400,199 | Harbers | May 14, 1946 |